United States Patent
Fujita et al.

(10) Patent No.: US 11,161,495 B2
(45) Date of Patent: Nov. 2, 2021

(54) FUEL-EMPTY-STATE RECOVERY DETERMINATION METHOD FOR HYBRID VEHICLE AND VEHICLE CONTROL DEVICE FOR SAME

(71) Applicant: Nissan Motor Co., Ltd., Yokohama (JP)

(72) Inventors: Yuki Fujita, Kanagawa (JP); Shunsuke Baba, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 23 days.

(21) Appl. No.: 16/770,814

(22) PCT Filed: Dec. 15, 2017

(86) PCT No.: PCT/JP2017/045181
§ 371 (c)(1),
(2) Date: Jun. 8, 2020

(87) PCT Pub. No.: WO2019/116561
PCT Pub. Date: Jun. 20, 2019

(65) Prior Publication Data
US 2020/0398812 A1    Dec. 24, 2020

(51) Int. Cl.
*B60W 10/06* (2006.01)
*B60W 20/15* (2016.01)
(Continued)

(52) U.S. Cl.
CPC ............ *B60W 10/06* (2013.01); *B60W 10/08* (2013.01); *B60W 20/15* (2016.01); *F02D 29/02* (2013.01);
(Continued)

(58) Field of Classification Search
CPC .......... B60K 6/46; B60W 10/06; B60W 10/08; B60W 10/24; B60W 20/00; B60W 20/15;
(Continued)

(56) References Cited

U.S. PATENT DOCUMENTS

| | | | | |
|---|---|---|---|---|
| 2012/0055446 A1* | 3/2012 | Hashizume | ......... | F02D 41/3082 123/349 |
| 2013/0151129 A1* | 6/2013 | Tatewaki | ............ | F02N 11/0848 701/112 |
| 2018/0149104 A1* | 5/2018 | Yamashita | ............ | F02D 41/062 |

FOREIGN PATENT DOCUMENTS

| | | |
|---|---|---|
| JP | H9-117012 A | 5/1997 |
| JP | 2004-84570 A | 3/2004 |

(Continued)

*Primary Examiner* — Carl C Staubach
(74) *Attorney, Agent, or Firm* — Young Basile Hanlon & MacFarlane, P.C.

(57) ABSTRACT

A fuel-empty-state recovery determination method including: when driving of the hybrid vehicle is started, performing rotation speed control of an electric power generator for a specified time, and then stopping the rotation speed control; in a case where it is detected that a state in which the rotation speed of an engine after stopping the rotation speed control is higher than a threshold continues for more than a first determination time, determining that recovery has been made from a fuel-empty state; in a case where the measured time does not exceed the first determination time, starting measurement of the time during which the rotation speed of the engine is lower than the threshold; and in a case where the measured time exceeds a second determination time, maintaining determination that the vehicle is in a fuel-empty state.

5 Claims, 8 Drawing Sheets

(51) Int. Cl.
   *B60W 10/08*       (2006.01)
   *F02D 29/02*       (2006.01)

(52) U.S. Cl.
   CPC .. *B60W 2510/0638* (2013.01); *B60Y 2200/92* (2013.01); *F02D 2200/101* (2013.01)

(58) Field of Classification Search
   CPC . B60W 2510/0638; B60W 2510/0676; B60W 2530/209; B60W 2710/0605; B60W 2710/081; B60W 2710/083; B60Y 2200/92; F02D 2200/06; F02D 2200/101; F02D 29/02; F02N 11/0848
   See application file for complete search history.

(56) References Cited

FOREIGN PATENT DOCUMENTS

| | | |
|---|---|---|
| JP | 2008-151077 A | 7/2008 |
| JP | 2012-57537 A | 3/2012 |
| JP | 2014-144672 A | 8/2014 |
| JP | 2016-210295 A | 12/2016 |
| WO | 2014/054723 A1 | 4/2014 |

\* cited by examiner

FUEL-EMPTY-STATE RECOVERY DETERMINATION METHOD FOR HYBRID VEHICLE AND VEHICLE CONTROL DEVICE FOR SAME

TECHNICAL FIELD

The present invention relates to a fuel-empty-state recovery determination method for a hybrid vehicle performed after it has been determined that the vehicle is in a fuel-empty state (after a fuel-empty state has been detected) and also relates to a vehicle control device for the method.

BACKGROUND

Examples of known fuel-empty-state determination methods for hybrid vehicles include a method disclosed in Japanese Patent Application Publication No. 2016-210295.

In the method disclosed in Japanese Patent Application Publication No. 2016-210295, engine start control for starting the engine is performed for a specified time, and in the case where the engine does not start independent operation after the specified time has passed, it is determined that the vehicle is in a fuel-empty state. The method also determines whether the vehicle has recovered from a fuel-empty state in the same way. In other words, when independent operation of the engine is detected even for a moment, the method will determine that the vehicle has recovered from a fuel-empty state. Hence, the method can fail to correctly determine whether recovery has been made from a fuel-empty state.

SUMMARY

The present invention has been made in light of the above problem, and an object thereof is to provide a fuel-empty-state recovery determination method for a hybrid vehicle capable of correctly determining whether recovery has been made from a fuel-empty state and also to provide a vehicle control device for the method.

A fuel-empty-state recovery determination method for a hybrid vehicle, according to an aspect of the present invention includes: when driving of the hybrid vehicle is started after it has been determined that the vehicle is in a fuel-empty state, performing rotation speed control of an electric power generator for a specified time; and in a case where it is detected that after stopping the rotation speed control, a state in which the rotation speed of the engine is higher than a threshold continues for more than a first determination time, determining that recovery has been made from a fuel-empty state.

The fuel-empty-state recovery determination method for a hybrid vehicle according to the present invention makes it possible to correctly determine whether recovery has been made from a fuel-empty state.

DETAILED DESCRIPTION

The following describes embodiments of the present invention based on the drawings.

First Embodiment

Figure 1:
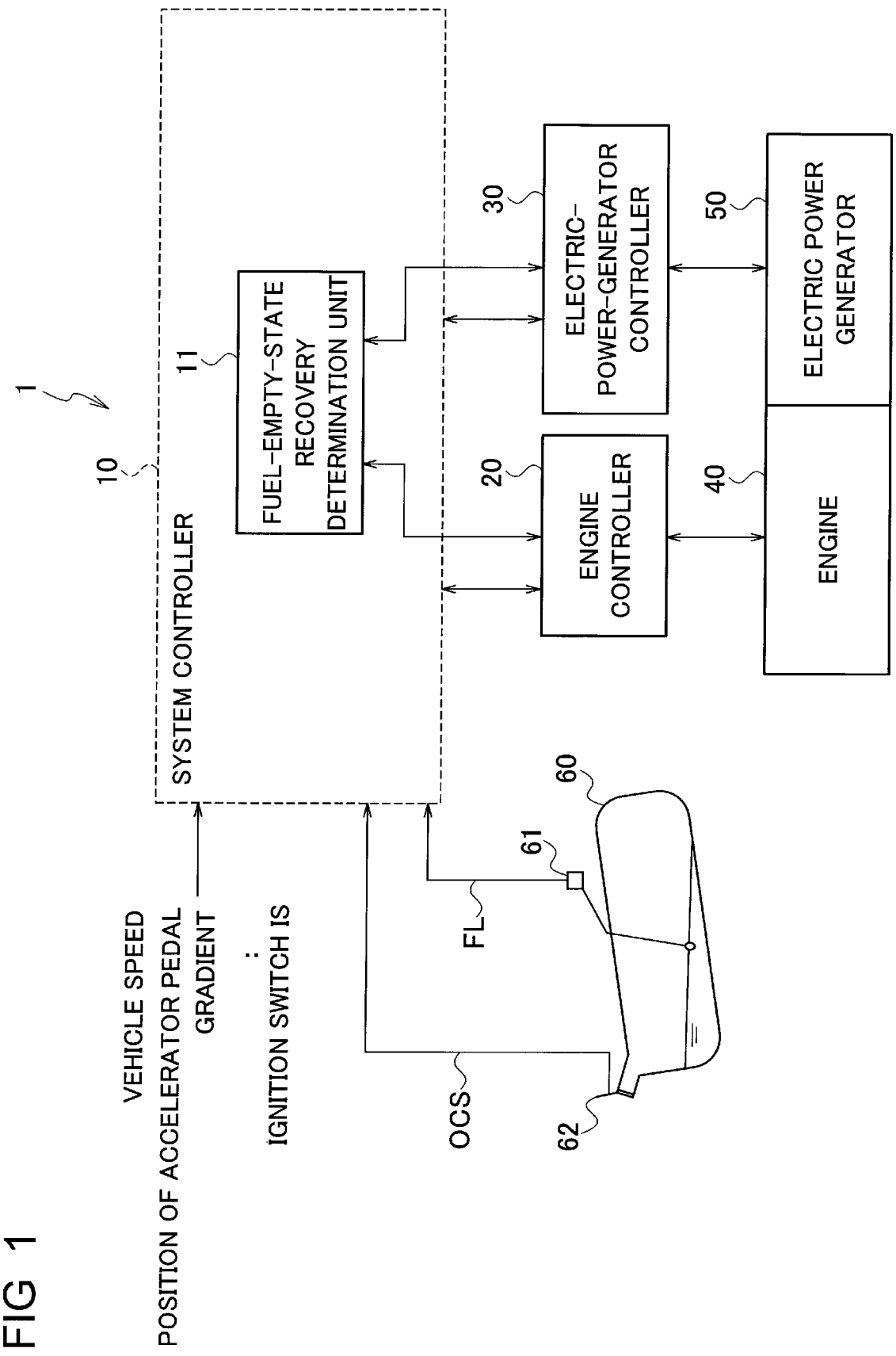
FIG. 1 is a block diagram illustrating a partial configuration of a vehicle including a fuel-empty-state recovery determination unit according to a first embodiment of the present invention.

FIG. 1 is a block diagram illustrating, as an example, a partial configuration of a vehicle including a fuel-empty-state recovery determination unit according to a first embodiment of the present invention. A vehicle 1 illustrated in FIG. 1 is described based on an example of a series hybrid vehicle.

The vehicle 1 illustrated in FIG. 1 includes a system controller 10, an engine controller 20, an electric-power-generator controller 30, an engine 40, an electric power generator 50, a battery (not illustrated), and a fuel tank 60. Note that illustration of configurations unnecessary for describing the present embodiment is omitted, such as a drive motor, the battery, reduction gears, and drive wheels. The system controller 10 includes a fuel-empty-state recovery determination unit (fuel-empty-state recovery determination circuit) 11 according to the present embodiment.

The system controller 10, the engine controller 20, and the electric-power-generator controller 30 may be implemented, for example, by means of a computer with a unitary structure including a central processing unit (CPU) and storage means such as RAM, ROM, and a hard disk.

The vehicle 1 uses the driving force of the engine 40 only for electric power generation. The engine 40 and the electric power generator 50 are connected via gears, and the electric power generated by the electric power generator 50 using the driving force of the engine 40 drives the drive motor (not illustrated).

The system controller 10 outputs engine-torque instructions to the engine controller 20 and outputs electric-power-generation-torque instructions to the electric-power-generator controller 30, according to the vehicle state such as the position of the accelerator pedal operated by the driver, the vehicle speed, and the gradient of the road surface; the battery information from a battery controller (not illustrated); and other information.

The engine controller 20 adjusts the throttle opening degree, the ignition timing, and the amount of fuel injection of the engine 40 to achieve the state instructed in the engine-torque instruction.

The electric-power-generator controller 30 controls the electric power generator 50 according to the conditions of the electric power generator such as the rotation speed and the voltage to achieve the state instructed in the electric-power-generator-torque instruction.

The system controller 10 makes fuel-empty-state determination based on the fuel level FL outputted by a fuel-level sensor 61 and the open/close signal OCS of a fuel-filler open/close sensor 62. The fuel-empty-state determination is made, for example, based on the time elapsed since the open/close signal OCS is generated and the value of the fuel level FL. Note that methods for the fuel-empty-state determination may include other various methods. For example, determination can be made based on only the value of the fuel level FL, or the fuel consumption determined from the amount of fuel injection may be used for the fuel-empty-state determination. The fuel-empty-state determination is made by a fuel-empty-state determination circuit (not illustrated) in the system controller 10.

In the following description, the operation of the fuel-empty-state recovery determination unit 11 is described on the assumption that the determination that the vehicle is in a fuel-empty state has been made by a certain method.

The fuel-empty-state recovery determination unit 11 determines whether the vehicle has recovered from a fuel-empty state (fuel-empty-state recovery determination) after the determination that the vehicle is in a fuel-empty state was made. In the fuel-empty-state recovery determination method, when the ignition switch IS is turned on, the rotation speed control of the electric power generator 50 is performed for a specified time and then stopped. If it is detected that after that, the state in which the rotation speed of the engine 40 is higher than a threshold continues for longer than a certain time, it is determined that recovery has been made from the fuel-empty state.

Note that the time when the ignition switch IS is turned on is the time when driving of a hybrid vehicle is started. Besides this operation, operations when driving of the hybrid vehicle is started include, for example, pressing the start button in the vicinities of the driver's seat or turning on the switch by moving up or down the switch lever. Alternatively, the time when driving of the hybrid vehicle is started may be defined as the time when the key is turned or when a driver has got into the vehicle.

Thus, in the fuel-empty-state recovery determination method according to the present embodiment, it is detected whether the engine 40 has rotated for more than a certain time, and this makes it possible to reliably detect recovery from a fuel-empty state. Thus, erroneous detection of recovery from a fuel-empty state can be prevented. Hereinafter, the operation of the fuel-empty-state recovery determination method will be described in detail by illustrating the procedure.

Figure 2:
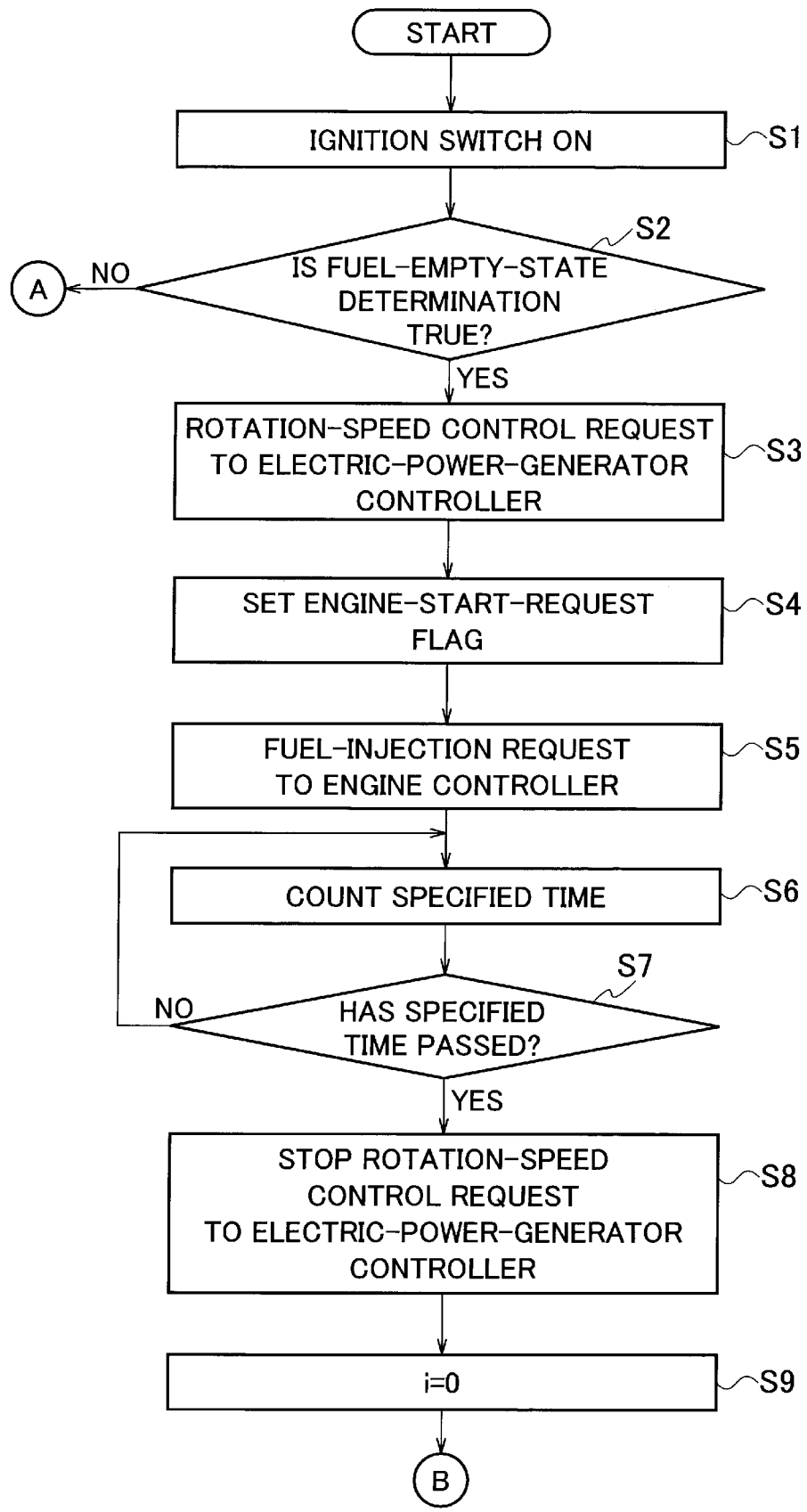
FIG. 2 is a flowchart illustrating an example of the procedure of a fuel-empty-state recovery determination method performed by the fuel-empty-state recovery determination unit illustrated in FIG. 1.
Figure 3:
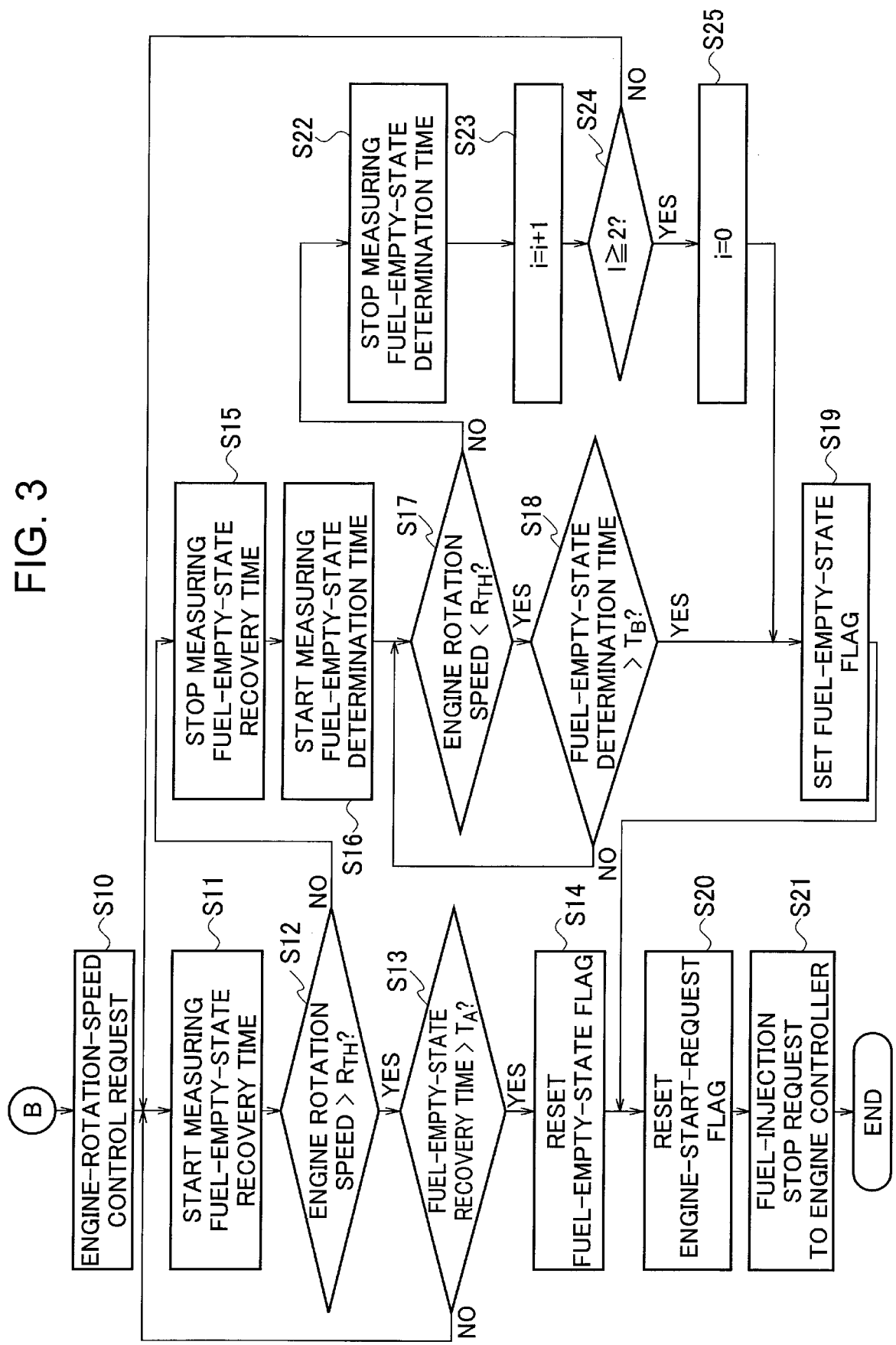
FIG. 3 is a flowchart illustrating an example of the procedure that follows the flowchart illustrated in FIG. 2.

FIGS. 2 and 3 are flowcharts illustrating the procedure of the fuel-empty-state recovery determination method according to the first embodiment of the present invention. The fuel-empty-state recovery determination unit 11 starts its operation when the ignition switch IS is turned on in a state where the determination that the vehicle is in a fuel-empty state has been made (step S1).

When the fuel-empty-state recovery determination unit 11 starts its operation, it first determines whether the vehicle is in a fuel-empty state by checking a fuel-empty-state determination flag fGK (step S2). If the fuel-empty-state determination flag fGK is false (for example, logic level 0), an ordinally engine start process assumed after connector A, which is not illustrated, is performed. In this case, the fuel-empty-state recovery determination unit 11 immediately ends the operation that it has started.

If the fuel-empty-state determination flag fGK is true (for example, logic level 1), the fuel-empty-state recovery determination unit 11 starts a process of the fuel-empty-state recovery determination method (YES at step S2). The description hereinafter also refers to FIG. 4.

Figure 4:
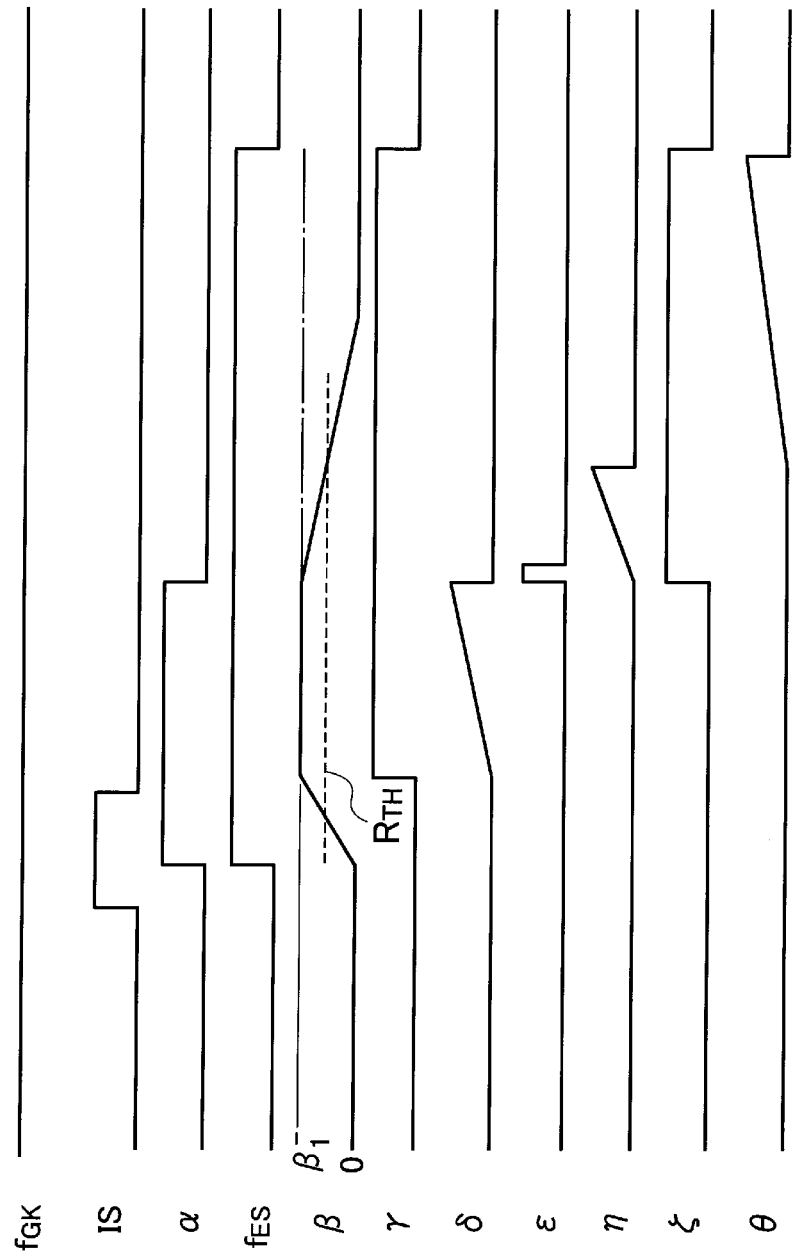
FIG. 4 is a diagram illustrating signals changing in the process illustrated in FIGS. 2 and 3, which shows a time chart for the case recovery has not been made from a fuel-empty state.

FIG. 4 is a time chart illustrating the procedure of the fuel-empty-state recovery determination method. In FIG. 4, the horizontal direction represents time, and the vertical direction represents the level of each signal. The dimension of each signal in the vertical direction is different for each signal. Each dimension will be explained when necessary.

Starting the process of the fuel-empty-state recovery determination method, the fuel-empty-state recovery determination unit 11 outputs an electric-power-generator•rotation-speed control request $\alpha$ to the electric-power-generator controller 30 (step S3). Then, the fuel-empty-state recovery determination unit 11 sets an engine-start-request flag fES which indicates that an engine start request has been issued for the purpose of the fuel-empty-state recovery determination (step S4). The electric-power-generator•rotation-speed control request $\alpha$ and the engine-start-request flag fES are signals having logic level 1 or 0.

Receiving the input of the electric-power-generator•rotation-speed control request $\alpha$, the electric-power-generator controller 30 starts rotating the electric power generator 50. The rotation speed $\beta$ of the engine 40 connected to the electric power generator 50 via gears increases from $\beta 0$ which indicates that the rotation speed is 0 and reaches rotation speed $\beta 1$ which is defined by the electric-power-generator•rotation-speed control request $\alpha$.

When the rotation speed $\beta$ of the engine 40 reaches rotation speed $\beta 1$, the fuel-empty-state recovery determination unit 11 receives information to that effect from the engine controller 20. Receiving the information that the rotation speed $\beta$ of the engine 40 has reached rotation speed $\beta 1$, the fuel-empty-state recovery determination unit 11 outputs a fuel-injection request $\gamma$ to the engine controller 20 (step S5).

After outputting the fuel-injection request $\gamma$, the fuel-empty-state recovery determination unit 11 starts counting a specified time (step S6). Here, the specified time means the time necessary for the engine 40 to start independent operation in a state where the engine 40 is being rotated by the electric power generator 50 and the fuel supply has been started.

During this specified time, the fuel-empty-state recovery determination unit 11 keeps outputting the electric-power-generator•rotation-speed control request $\alpha$ (NO loop at step S7). During this time, the count value $\delta$ of the timer for counting the specified time increases as time elapses. When the count value reaches the specified value, in other words, when the timer finishes counting the specified time (YES at step S7), a complete-explosion-determination start signal $\epsilon$ is generated in the fuel-empty-state recovery determination unit 11. When the complete-explosion-determination start signal $\epsilon$ is generated, the fuel-empty-state recovery determination unit 11 stops outputting the electric-power-generator•rotation-speed control request $\alpha$ (step S8). Complete explosion means that the engine 40 has started explosion and has started the independent operation.

The specified time may be different depending on the engine water temperature of the engine 40 as shown in Table 1. The length of the specified time may be changed, for example, such that when the engine water temperature is −20° C. or less, the specified time is set to 30 seconds; for −10° C. or less, 20 seconds; and for a temperature range higher than −10° C., 10 seconds.

TABLE 1

| | Value | | | | | | | |
|---|---|---|---|---|---|---|---|---|
| Engine water temperature (° C.) | −30 | −20 | −10 | 0 | 20 | 40 | 80 | 120 |
| Specified time (second) | 30 | 30 | 20 | 10 | 10 | 10 | 10 | 10 |

In other words, the specified time corresponds to multiple specified ranges of the engine water temperature, and the specified time corresponding to ranges in which the engine water temperature is high is shorter than the specified time corresponding to ranges in which the engine water temperature is low. This setting makes it possible for the engine 40 to reliably start its independent operation in a state where recovery has been made from a fuel-empty state. As a result, the fuel-empty-state recovery determination can be made correctly.

After stopping the output of the electric-power-generator•rotation-speed control request α, the fuel-empty-state recovery determination unit 11 resets variable i for counting the number of repetitions to 0 (step S9). Repeating processes will be described later.

Concurrently with stopping the output of the electric-power-generator•rotation-speed control request α, the fuel-empty-state recovery determination unit 11 outputs an engine•rotation-speed control request ζ to the engine controller 20 (step S10). The engine•rotation-speed control request ζ is digital numerical information. The engine controller 20 controls the engine 40 with the amount of fuel injection and the ignition timing that correspond to the numerical value of the engine•rotation-speed control request ζ.

After outputting the engine•rotation-speed control request ζ to the engine controller 20, the fuel-empty-state recovery determination unit 11 starts counting a fuel-empty-state recovery time (step S11). Here, the fuel-empty-state recovery time is defined as the time during which when the rotation speed β of the engine 40 is higher than the threshold RTH. The fuel-empty-state recovery time is counted by a timer in the same way as for the foregoing specified time. The count value η of the timer for counting the fuel-empty-state recovery time increase as time elapses.

If the engine 40 starts its independent operation after the output of the electric-power-generator•rotation-speed control request α is stopped (step S8), the engine 40 keeps rotating, maintaining the rotation speed β corresponding to the numerical value of the engine•rotation-speed control request ζ (the dashed dotted line of β in FIG. 4). On the other hand, if the engine 40 does not start its independent operation, the rotation speed β decreases because of friction until it comes to a free stop (the falling solid line of β in FIG. 4). The example illustrated in FIG. 4 illustrates a case where the engine 40 does not starts its independent operation.

Here, if the fuel-empty-state recovery time exceeds a first determination time TA set in advance, the fuel-empty-state recovery determination unit 11 determines that the vehicle has recovered from a fuel-empty state (YES at step S13). In other words, it determines that the fuel tank 60 has fuel, and that the engine 40 can perform independent operation. This state in which recovery has been made from a fuel-empty state will be described later using a time chart.

(Fuel-Empty State)

On the other hand, if the vehicle is in a fuel-empty state, the rotation speed β of the engine 40 falls below a threshold RTH within the first determination time TA (NO at step S12). If the rotation speed β falls below the threshold RTH within the first determination time TA, the fuel-empty-state recovery determination unit 11 immediately stops measuring the fuel-empty-state recovery time and resets the count value η of the timer for measuring the fuel-empty-state recovery time (step S15).

Then, the fuel-empty-state recovery determination unit 11 starts measuring the fuel-empty-state determination time (step S16). The fuel-empty-state determination time is measured by a timer in the same way as for the above specified time and the fuel-empty-state recovery time. The count value θ of the timer for measuring the fuel-empty-state determination time increases as time elapses.

The fuel-empty-state recovery determination unit 11 measures the fuel-empty-state determination time during which the rotation speed β of the engine 40 is lower than the threshold RTH (NO at step S18). If the fuel-empty-state determination time exceeds a second determination time TB set in advance, the fuel-empty-state recovery determination unit 11 determines that the engine 40 will not start independent operation and sets the fuel-empty-state determination flag fGK (step S19). In the case of this example, the state of the fuel-empty-state determination flag fGK that has been set to "true" is maintained.

Then, the fuel-empty-state recovery determination unit 11 resets the engine-start-request flag fES (step S20). Specifically, the fuel-empty-state recovery determination unit 11 lowers the engine-start-request flag fES to logic level 0. The fuel-empty-state recovery determination unit 11 also stops outputting the fuel-injection request γ and the engine•rotation-speed control request ζ to the engine controller 20 (step S21) and ends the process of the fuel-empty-state recovery determination method.

(Recovery from Fuel-Empty State)

Figure 5:
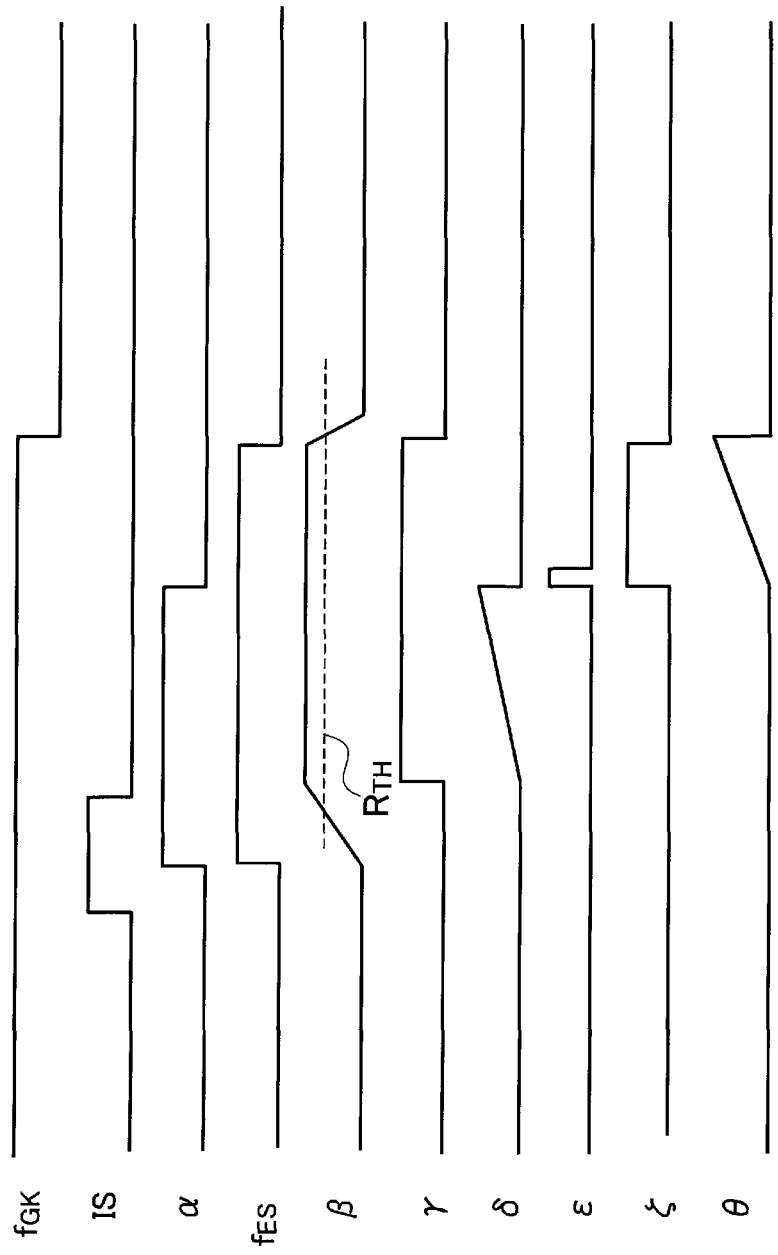
FIG. 5 is a diagram illustrating signals changing in the process illustrated in FIGS. 2 and 3, which shows a time chart for the case recovery has been made from a fuel-empty state.

FIG. 5 is a time chart illustrating the procedure of the fuel-empty-state recovery determination method in the state where recovery has been made from a fuel-empty state. FIG. 5 is different from FIG. 4 in that the engine 40 keeps rotating, maintaining the rotation speed β over the threshold RTH after the fuel-empty-state recovery determination unit 11 stops outputting the electric-power-generator•rotation-speed control request α and outputs the engine•rotation-speed control request ζ to the engine controller 20 (step S10).

In FIG. 5, even after the fuel-empty-state recovery determination unit 11 stops outputting the electric-power-generator•rotation-speed control request α, the engine 40 keeps rotating at a rotation speed β corresponding to the numerical value of the engine•rotation-speed control request ζ. Thus, the fuel-empty-state recovery time exceeds the first determination time TA (YES at step S13).

In this case, the fuel-empty-state recovery determination unit 11 determines that the engine 40 can perform its independent operation and resets the fuel-empty-state determination flag fGK (step S14). The fuel-empty-state recovery determination unit 11 then resets the engine-start-request flag fES (step S20), stops outputting the fuel-injection request γ and the engine•rotation-speed control request ζ to the engine controller 20 (step S21), and ends the process of the fuel-empty-state recovery determination method.

As has been described above, in the fuel-empty-state recovery determination method according to the present embodiment, when a specified time has passed after requesting the engine controller 20 that controls the engine 40 to perform fuel injection, a rotation speed control request is issued to the engine controller 20, and the measurement of the time during which the rotation speed of the engine 40 is higher than or equal to the threshold RTH is started. If the measured time exceeds the first determination time TA, it is determined that the vehicle has recovered from a fuel-empty state. If the measured time does not exceed the first determination time TA, the measurement of the time during which the rotation speed β of the engine 40 is lower than the threshold RTH is started. If the measured time exceeds the second determination time TB, the determination that the vehicle is in a fuel-empty state is maintained. Thus, this fuel-empty-state recovery determination method makes it possible to correctly determine whether recovery has been made from a fuel-empty state.

In addition, as the above connector A (illustrated in FIG. 2) indicates, the fuel-empty-state recovery determination method according to the present embodiment can have separate different processes for ordinary operation and for the fuel-empty-state recovery determination. Thus, the electric-power-generation-torque instruction and the engine-torque instruction for the ordinary start of the engine 40 performed after connector A can be different from these two torque instructions for the fuel-empty-state recovery determination. Hence, different torque instruction values can be assigned depending on the purpose such that the engine-torque instruction for the ordinary operation is, for example, 40 Nm, and the one for the fuel-empty-state recovery determination is, for example, 5 Nm. The engine-torque instruction for a small torque makes the fuel-empty-state recovery determination more accurate.

In a fuel-empty state, if the time during which the rotation speed β of the engine 40 is higher than the threshold RTH does not exceed the first determination time TA, the measurement of the time during which the rotation speed β of the engine 40 is lower than the threshold RTH is started. If the measured time exceeds the second determination time TB, the determination that the vehicle is in a fuel-empty state is maintained. Thus, the correct determination can be made also in the fuel-empty state.

Note that the first determination time TA and the second determination time TB may be the same length or may be set to different lengths. For example, the second determination time TB is set longer than the first determination time TA. This setting makes it possible to determine more carefully whether recovery has been made from a fuel-empty state (recovery from a fuel-empty state).

Note that the first determination time TA may be different so as to correspond to the engine water temperature in the same way as for the above specified time. The "specified time (second)" in Table 1 may be changed to the "first determination time TA (second)", for example, with the relationship with the "value" kept the same. In other words, the first determination time TA for the case where the engine water temperature is high is shorter than the first determination time for the case where the engine water temperature is low. This setting makes it possible for the engine 40 to reliably starts its independent operation in a state where recovery has been made from a fuel-empty state.

In the case where a fuel-empty state has not been resolved, engine stall is repeated in some cases within the first determination time TA. In that case, the number of times when the rotation speed β of the engine 40 becomes lower than the threshold RTH may be counted, and if the number reaches a specified number, the determination that the vehicle is in a fuel-empty state may be maintained. Next, a modification of the fuel-empty-state determination will be described.

(Modification of Fuel-Empty-State Determination)

The flowchart illustrated in FIG. 3 also includes a step of counting the number of times when the rotation speed β of the engine 40 becomes lower than the threshold RTH. The operation of this step will be described with reference to FIGS. 3 and 6.

Figure 6:
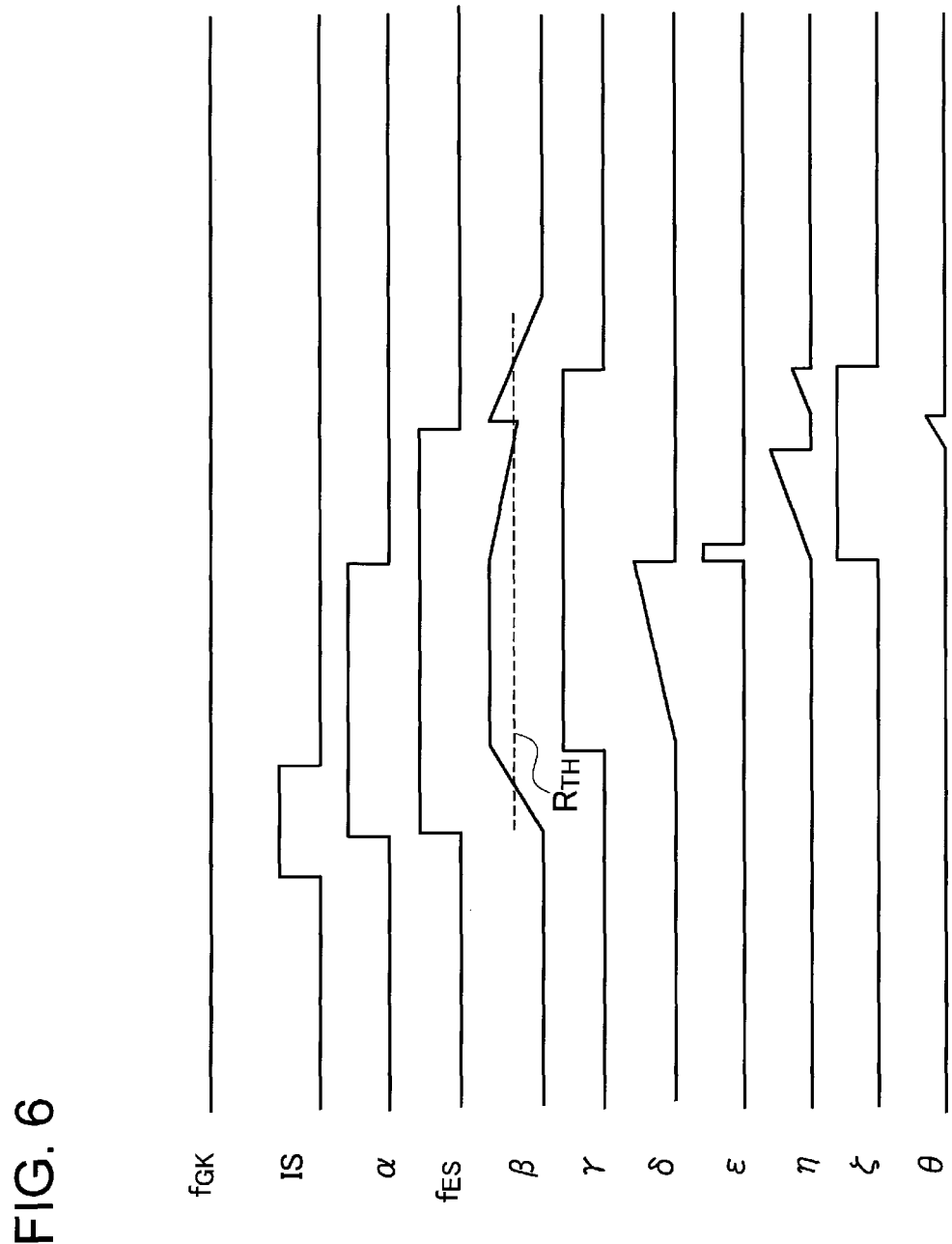
FIG. 6 is a diagram illustrating signals changing in other procedure of the fuel-empty-state recovery determination method according to the first embodiment of the present invention, which shows a time chart for the case recovery has not been made from a fuel-empty state.

The relationship between the horizontal direction and the vertical direction in FIG. 6 is the same as that in FIGS. 4 and 5. FIG. 6 is different from FIGS. 4 and 5 in that engine stalls are repeated while the fuel-empty-state recovery determination unit 11 is outputting the engine-rotation-speed control request ζ.

The rotation speed β of the engine 40 immediately after the fuel-empty-state recovery determination unit 11 starts outputting the engine-rotation-speed control request ζ is the rotation speed β at which the engine 40 was being rotated by the electric power generator 50. After that, if the engine 40 starts its independent operation, the rotation speed β will become one corresponding to the numerical value of the engine-rotation-speed control request ζ. However, if the engine 40 does not start independent operation, the rotation speed β decreases due to friction (NO at step S12).

In this state, there are cases where the engine 40 resumes rotation for some reason in response to the engine•rotation-speed control request ζ (NO at step S17). In that case, the fuel-empty-state recovery determination unit 11 resets the timer for measuring the fuel-empty-state determination time (count value θ=0, step S22).

Then, the fuel-empty-state recovery determination unit 11 increments variable i for counting the number of repetitions (step S23). After incrementing variable i, the fuel-empty-state recovery determination unit 11 determines whether variable i is 2 or more (step S24). Here, variable i=0+1=1 (NO at step S24).

Thus, the fuel-empty-state recovery determination unit 11 again starts measuring the fuel-empty-state recovery time (step S11). Specifically, the fuel-empty-state recovery determination unit 11 counts up the count value η of the timer for measuring the fuel-empty-state recovery time (NO loop at step S13).

Here, if the rotation speed β of the engine 40 becomes lower than the threshold RTH again before the fuel-empty-state recovery time exceeds the first determination time TA, variable i becomes (1+1=) 2 via the NO prong at step S12 and the NO prong at step S17.

When variable i becomes 2, variable i is reset (step S25), and the fuel-empty-state determination flag fGK is immediately set (step S19). In the case of this example, the state of the fuel-empty-state determination flag fGK that has been set to "true" is maintained.

As described above, in the fuel-empty-state recovery determination method according to the present embodiment, after the rotation speed β of the engine 40 becomes lower than the threshold RTH while the time during which the rotation speed β of the engine 40 is higher than the threshold RTH is being measured, if the rotation speed β of the engine 40 again becomes higher the threshold RTH repeatedly, the number of the repetitions may be counted. If the number reaches a specified number, the determination that the vehicle is in a fuel-empty state may be maintained. This operation makes it possible to correctly determine the fuel-empty state.

Note that although the modification illustrated is an example in which the first determination time TA for determining whether recovery has been made from a fuel-empty state in the case where the rotation speed β of the engine 40 again becomes higher than the threshold RTH is the same as the first determination time TA used for the first determination, the length of the determination time may be set differently. Next, a second embodiment will be described in which in the case where engine stalls are repeated while the fuel-empty-state recovery time is being measured, the length of the determination time for making the second or subsequent determination of whether recovery has been made from a fuel-empty state is different from the length of the determination time for making the first determination.

Second Embodiment

Figure 7:
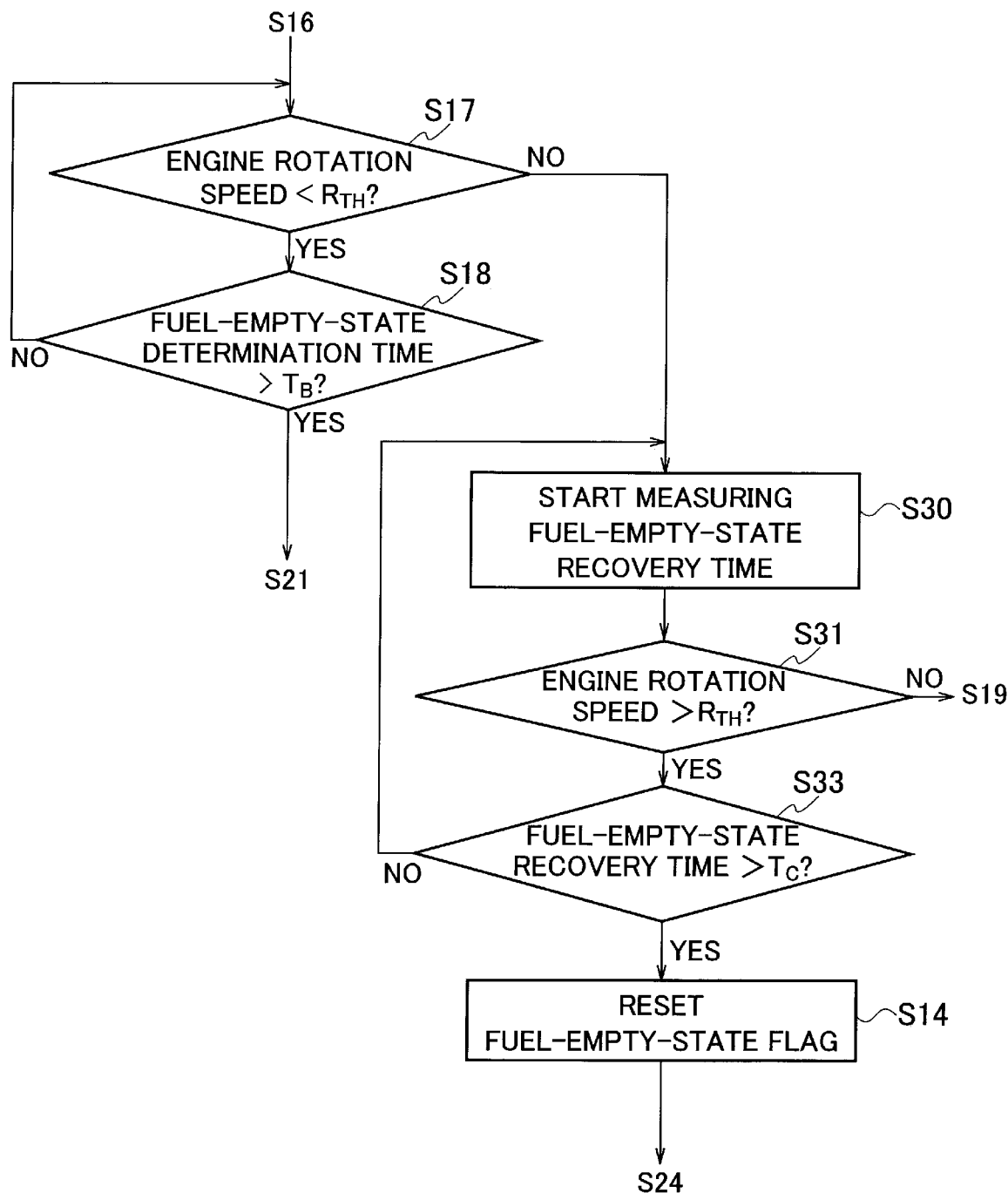
FIG. 7 is a flowchart illustrating part of the procedure of a fuel-empty-state recovery determination method according to a second embodiment of the present invention.

FIG. 7 is a flowchart illustrating part of the procedure of a fuel-empty-state recovery determination method according to a second embodiment. FIG. 7 is a flowchart in which the time for determining whether recovery has been made from a fuel-empty state is set to a third determination time TC in the case where an engine stall occurs once while the fuel-empty-state recovery determination unit 11 is outputting the engine•rotation-speed control request ζ, and then the engine 40 resumes rotation for some reason (NO at step S17). For example, the length of the third determination time TC is set such that the third determination time TC>the first determination time TA.

Figure 8:
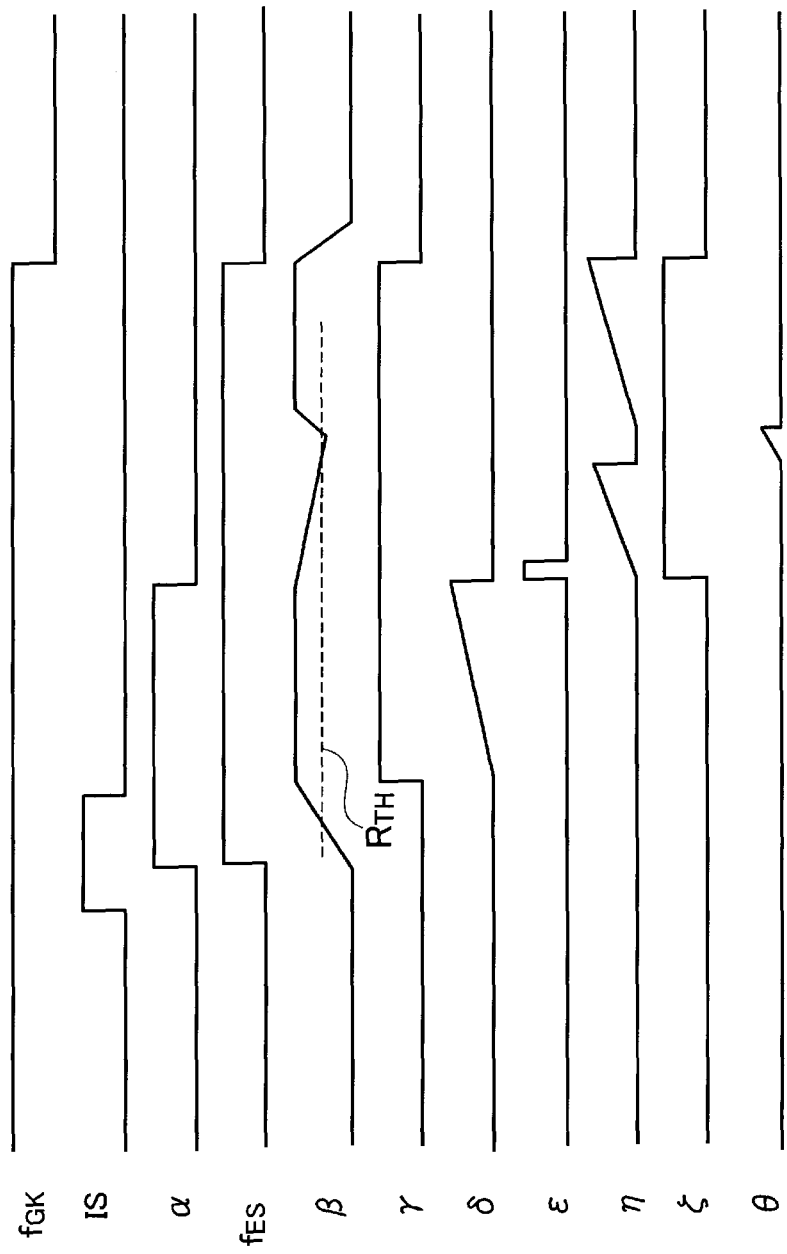
FIG. 8 is a diagram illustrating signals changing in the process illustrated in FIG. 7, which shows a time chart for the case recovery has been made from a fuel-empty state.

This operation will be described also with reference to FIG. 8. The relationship between the horizontal direction and the vertical direction in FIG. 8 is the same as that in FIG. 6 and others.

If the engine 40 resumes rotation at a rotation speed β higher than or equal to the threshold RTH after the first engine stall (NO at step S17), the fuel-empty-state recovery determination unit 11 starts measuring the fuel-empty-state recovery time again (step S30). The count value η of the timer for measuring the fuel-empty-state recovery time increases as time elapses (the second signal of 11 in FIG. 8).

Then, if the time during which the rotation speed β of the engine 40 is higher than or equal to the threshold RTH exceeds the third determination time TC, the fuel-empty-state recovery determination unit 11 determines that the engine 40 can perform independent operation and resets the fuel-empty-state determination flag fGK (step S14). FIG. 8 illustrates the state in which the fuel-empty-state determination flag fGK is reset.

If the time during which the rotation speed β of the engine 40 is higher than or equal to the threshold RTH does not exceed the third determination time TC, the fuel-empty-state determination flag fGK is set (step S19).

As described above, in the fuel-empty-state recovery determination method according to the present embodiment, after the rotation speed of the engine 40 becomes lower than the threshold RTH while the time during which the rotation speed β of the engine 40 is higher than or equal to the threshold RTH is being measured, if the rotation speed β of the engine 40 becomes higher than or equal to the threshold RTH again, the measurement of the time during which the rotation speed β of the engine 40 is higher than or equal to the threshold RTH is started. If the measured time exceeds the third determination time TC which is longer than the first determination time TA, it may be determined that recovery has been made from a fuel-empty state. This operation makes it possible to determine the fuel-empty state more accurately.

As has been described above, in the fuel-empty-state recovery determination method for a hybrid vehicle according to the present embodiment, the rotation speed control of the electric power generator 50 is performed for a specified time, and then stopped. After that, if it is detected that the state after that in which the rotation speed β of the engine 40 is higher than the threshold RTH continues for more than the first determination time TA, it is determined that recovery has been made from a fuel-empty state. In other words, after the rotation speed control of the electric power generator 50 is stopped using a timer, checking for the fuel-empty-state recovery determination starts using the timing at which when the engine controller 20 starts independent-operation control. This operation makes it possible to correctly determine the fuel-empty state. As a result, it is possible to reduce the electric power consumption unnecessarily consumed in the rotation speed control of the electric power generator 50 for starting the engine 40.

Note that as already stated, there can be a difference between the torque instruction for the ordinary operation of the engine 40 and the one for the fuel-empty-state recovery determination. Accordingly, the torque instruction for ordinary operation can be set larger, and this reduces rattling noise of gears. In addition, the torque instruction for the fuel-empty-state recovery determination can be set smaller, and this makes it possible to accurately determine whether the engine 40 can perform independent operation.

Besides the torque instruction, the rotation speed control may be set differently. The target rotation speed of the rotation speed control of the electric power generator 50 may be different between for the ordinary operation and for the fuel-empty-state recovery determination. For example, the target rotation speed inputted for the purpose of the rotation speed control to the electric-power-generator controller 30 which controls the electric power generator 50 is set higher than the target rotation speed inputted to the electric-power-generator controller 30 for the purpose of electric power generation for the case of not performing the fuel-empty-state recovery determination. Thus, even in the case where the torque instruction for the fuel-empty-state recovery determination is set smaller than the one for the ordinary operation in order to accurately determine if the engine 40 can perform independent operation as described above, the higher target rotation speed increases the frequency of rattling noise, and this reduces discomfort caused by the rattling noise. This also makes it possible to perform the fuel-empty-state recovery determination at a more suitable rotation speed β.

In other words, the target rotation speed of the rotation speed control of the electric power generator 50 is set higher than the target rotation speed of the rotation speed control of the electric power generator 50 at the time of starting the engine 40 without performing the above fuel-empty-state recovery determination. This makes it possible to perform the fuel-empty-state recovery determination more properly and also to start the engine 40 for the ordinary operation more properly.

Although the foregoing embodiments have been described based on examples in which the fuel-empty-state recovery determination is performed once as illustrated in FIGS. 4, 5, 6, and 8, the above fuel-empty-state recovery determination may be repeated multiple times to determine whether recovery has been made from a fuel-empty state. In that case, the operation from when the rotation speed of the engine 40 is 0 to setting the engine-start-request flag fES is repeated, for example, three times. For example, in the case where it is determined three times in a row that recovery from a fuel-empty state has not been made, the determination that the vehicle is in a fuel-empty state may be maintained. This makes it possible to reliably determine whether recovery has been made from a fuel-empty state. For example, in the case where unburned gasoline remains in the engine 40, the engine 40 cannot fully perform independent operation in the first fuel-empty-state recovery determination in some cases, and this may make it impossible to determine whether recovery has been made from a fuel-empty state. Performing the fuel-empty-state recovery determination multiple times makes it possible to more reliably determine whether recovery has been made from a fuel-empty state. However, too many trials lead to an increase of the electric power consumption unnecessarily consumed by the rotation speed control of the electric power generator 50 and thus need to be avoided.

After the rotation speed of the engine 40 becomes 0 while the time during which the rotation speed of the engine 40 is higher than the threshold RTH is being measured, the rotation speed control of the electric power generator 50 is performed again for a specified time, and then stopped. A rotation speed control request is issued to the engine controller 20, and the measurement of the time during which the rotation speed of the engine 40 is higher than or equal to the threshold RTH is started. In the case where the rotation speed of the engine 40 repeatedly becomes 0 while the time during which the rotation speed of the engine 40 is higher than or equal to the threshold RTH is being measured, the number of the repetitions is counted. If the number reaches a specified number, the determination that the vehicle is in a fuel-empty state is maintained. This makes it possible to more reliably determine whether recovery has been made from a fuel-empty state.

The fuel-empty-state recovery determination method and the vehicle control device according to the present invention have been described based on the illustrated embodiments. However, the present invention is not limited to these illustrated embodiments, and the configuration of each part may be replaced with any configuration having the same or similar functions. For example, a configuration described in the first embodiment can be applied to the second embodiment, and the configuration will provide the same operational advantages. In addition, although the above embodiments have been described based on examples of a series hybrid vehicle, the present invention can also be applied to parallel hybrid vehicles.

In addition, the functional units in the foregoing embodiments may be implemented by one or multiple processing circuits. Examples of the processing circuits include programmed processing devices such as processing devices including electrical circuits. The processing devices may include an application specific integrated circuit (ASIC) or a device such as a conventional circuit part that is arranged to perform the functions described in the embodiments.

REFERENCE SIGNS LIST 1 vehicle
10 system controller
11 fuel-empty-state recovery determination unit (fuel-empty-state recovery determination circuit)
20 engine controller
30 electric-power-generator controller
40 engine
50 electric power generator
60 fuel tank
61 fuel-level sensor
62 fuel-filler open/close sensor
IS ignition switch
OCS open/close signal
FL fuel level
RTH threshold
fGK fuel-empty-state determination flag
fES engine-start-request flag
TA first determination time
TB second determination time
TC third determination time
α electric-power-generator•rotation-speed control request
β rotation speed
γ fuel-injection request
δ count value for specified time
ε complete-explosion-determination start signal
η count value for fuel-empty-state recovery time
ζ engine•rotation-speed control request
θ count value for fuel-empty-state determination time

The invention claimed is:

1. A fuel-empty-state recovery determination method for a hybrid vehicle including an engine and an electric power generator that is driven by the engine and generates electric power for driving the vehicle, the method being performed after it has been determined that the vehicle is in a fuel-empty state, the method comprising:
when driving of the hybrid vehicle is started, performing rotation speed control of the electric power generator for a specified time, and then stopping the rotation speed control;
in a case where it is detected that after stopping the rotation speed control, a state in which a rotation speed of the engine is higher than a threshold continues for more than a first determination time, determining that recovery has been made from a fuel-empty state;
in a case where the time during which the rotation speed of the engine is higher than or equal to the threshold does not exceed the first determination time, starting measurement of the time during which the rotation speed of the engine is lower than the threshold; and
in a case where the measured time exceeds a second determination time, maintaining determination that the vehicle is in a fuel-empty state, wherein
the second determination time is longer than the first determination time, and
a target rotation speed of the rotation speed control is higher than a target rotation speed of the rotation speed control of the electric power generator at the time of starting the engine without performing the fuel-empty-state recovery determination.

2. The fuel-empty-state recovery determination method for a hybrid vehicle according to claim 1, further comprising
in a case where after the rotation speed of the engine becomes lower than the threshold while the time during which the rotation speed of the engine is higher than or equal to the threshold is being measured, the rotation speed of the engine becomes higher than or equal to the threshold again, starting measurement of the time during which the rotation speed of the engine is higher than or equal to the threshold, and
in a case where the measured time exceeds a third determination time that is longer than the first determination time, determining that recovery has been made from a fuel-empty state.

3. The fuel-empty-state recovery determination method for a hybrid vehicle according to claim 1, further comprising
after the rotation speed of the engine becomes 0 while the time during which the rotation speed of the engine is higher than the threshold is being measured, performing the rotation speed control of the electric power generator again for a specified time, and then stopping the rotation speed control, requesting an engine controller to perform rotation speed control, and starting measurement of the time during which the rotation speed of the engine is higher than or equal to the threshold, in a case where the rotation speed of the engine repeatedly becomes 0 while the time during which the rotation speed of the engine is higher than or equal to the threshold is being measured, counting the number of the repetitions, and in a case where the number reaches a specified number, maintaining determination that the vehicle is in a fuel-empty state.

4. The fuel-empty-state recovery determination method for a hybrid vehicle according to claim 1, wherein the first determination time for a case where engine water temperature is high is shorter than the first determination time for a case where the engine water temperature is low.

5. A vehicle control device for a hybrid vehicle including an engine and an electric power generator that is driven by the engine and generates electric power for driving the vehicle, comprising:

a fuel-empty-state determination circuit that determines whether the vehicle is in a fuel-empty state; and a fuel-empty-state recovery determination circuit that, after the fuel-empty-state determination circuit has determined that the vehicle is in a fuel-empty state, performs rotation speed control of the electric power generator for a specified time and then stops the rotation speed control, and that, in a case where it is detected that after stopping the rotation speed control, a state in which a rotation speed of the engine is higher than a threshold continues for more than a first determination time, determines that recovery has been made from a fuel-empty state, wherein in a case where the time during which the rotation speed of the engine is higher than or equal to the threshold does not exceed the first determination time, the fuel-empty-state determination circuit starts measurement of the time during which the rotation speed of the engine is lower than the threshold, in a case where the measured time exceeds a second determination time, the fuel-empty-state determination circuit maintains determination that the vehicle is in a fuel-empty state, the second determination time is longer than the first determination time, and a target rotation speed of the rotation speed control is higher than a target rotation speed of the rotation speed control of the electric power generator at the time of starting the engine without performing the fuel-empty-state recovery determination.

* * * * *